(12) United States Patent
Fitzer et al.

(10) Patent No.: US 6,396,616 B1
(45) Date of Patent: May 28, 2002

(54) DIRECT LASER IMAGING SYSTEM

(75) Inventors: Robert C. Fitzer, North Oaks; Hung Thien Tran, Woodbury, both of MN (US); Biljana Tadic-Galeb, Thousand Oaks, CA (US); Sherman L. Bartz, St. Paul; Donald C. Grillo, Eagan, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 23 days.

(21) Appl. No.: 09/685,754

(22) Filed: Oct. 10, 2000

(51) Int. Cl.[7] ............................................. G02B 26/08
(52) U.S. Cl. ......................... 359/206; 359/204; 359/207
(58) Field of Search ................................ 359/204–207, 359/216–219, 662; 347/241–244, 258–262

(56) References Cited

U.S. PATENT DOCUMENTS

| | | |
|---|---|---|
| 4,099,830 A | 7/1978 | Whittle et al. |
| 4,499,437 A | 2/1985 | Blazey ........................ 332/7.51 |
| 4,549,190 A | 10/1985 | Ohara ......................... 346/108 |
| 4,796,038 A | 1/1989 | Allen et al. ..................... 354/4 |
| 5,241,330 A | 8/1993 | Kawabata et al. ........... 346/108 |
| 5,298,729 A | 3/1994 | Wike, Jr. .................... 235/467 |
| 5,309,178 A | 5/1994 | Gross .......................... 346/108 |
| 5,402,409 A | 3/1995 | Kataoka et al. .............. 369/124 |
| 5,506,719 A | 4/1996 | Murakami et al. ........... 359/216 |
| 5,530,579 A | 6/1996 | Nakamura et al. ........... 359/216 |
| 5,550,571 A | 8/1996 | Shoji |
| 5,631,687 A | 5/1997 | Tanaka ........................ 347/134 |
| 5,657,146 A | 8/1997 | Choi et al. |
| 5,659,532 A * | 8/1997 | Kamioka et al. ............ 359/206 |
| 5,726,793 A | 3/1998 | Boardman et al. ........... 359/216 |
| 5,766,827 A | 6/1998 | Bills et al. ................... 430/346 |
| 5,822,345 A | 10/1998 | Sousa et al. ................... 372/38 |
| 5,867,298 A | 2/1999 | Harrigan et al. ............. 359/201 |
| 5,875,206 A | 2/1999 | Chang |
| 5,877,800 A | 3/1999 | Robinson et al. ............ 347/255 |
| 5,929,892 A | 7/1999 | Towner et al. ............... 347/255 |
| 6,023,059 A | 2/2000 | Blanding ..................... 250/234 |

FOREIGN PATENT DOCUMENTS

| | | |
|---|---|---|
| EP | 0 625 846 A | 11/1994 |
| EP | 0 708 520 A | 4/1996 |

* cited by examiner

*Primary Examiner*—James Phan
(74) *Attorney, Agent, or Firm*—Dicke, Billig & Czaja, P.A.

(57) ABSTRACT

A laser imaging system for direct imaging with high optical power density a series of pixels forming an image on a media surface, The laser imaging system includes a laser light source, wherein the laser light source emits a laser beam representative of the image on the media surface. An optical path is defined between the laser light source and the media surface. A scanner is provided having a mirrored surface positioned along the optical path. An optical assembly is positioned along the optical path for shaping and focusing the laser beam at the media surface, including an F-Theta lens assembly positioned along the optical path between the scanner and the media surface. The F-Theta lens assembly includes a spheric lens, an aspheric lens and a toric lens, providing an increase in optical power density at the media surface.

26 Claims, 10 Drawing Sheets

DIRECT LASER IMAGING SYSTEM

TECHNICAL FIELD

The present invention relates generally to laser imaging assemblies and laser imaging systems incorporating such assemblies. In particular, the present invention relates to a small, low input power, high-resolution direct laser imaging system which utilizes a demagnification optical assembly providing high power density at the media surface and which may be precisely controlled for scanning within an x-y coordinate system.

BACKGROUND OF THE INVENTION

Laser imaging systems are commonly used to produce photographic or electrophotographic images from digital image data generated by computer-controlled or microprocessor-based scanner systems. The digital image data is a sequence of digital image values representative of the scanned image, Image processing electronics within an image management subsystem processes the image data values to generate a sequence of digital laser drive values (i.e., exposure values), which are input to a laser scanner. The laser scanner is responsive to the digital laser drive values for scanning across the photosensitive film or an electrophotographic drum in a raster pattern exposing the latent image on the film or drum surface. In either of these systems, further development is required to obtain a useful image.

Optical scanning assemblies are used to provide uniform exposure of the image on photosensitive film. The optical scanning assemblies combine a laser system with unique optical configurations (i.e., lenses and mirrors), for uniform exposure of the image onto the film. Such systems combine complex, multi-sided mirrors and lens configurations for directing and magnifying the laser beam as it is scanned across a moving or stationary photosensitive film.

One known laser imaging system includes a polygon mirror scanner. The polygon mirror scanner configuration has a polygon mirror which repetitively exposes successive raster lines or scan lines across a sheet of moving photosensitive film or electrophotographic media. The scan lines extend across the entire sheet. The film can be held stationary, moved at a constant speed, or in stepped increments after each successive scan line. Such scanning systems are rather large and require optical assemblies for focusing, directing, and magnifying the laser beam at the film surface, across the entire surface of the sheet.

For example, known electrophotographic imaging systems require very low laser energy of less than 500 microjoules/cm$^2$. This allows for the use of optical assemblies having magnification factors between 5 and 30 times for magnification of the laser beam. Certain films or media surfaces (e.g., black aluminum suboxides) require significant beam energy (more than 10 millijoules per cm$^2$) for forming an image. In order to provide this much energy in a reasonable time frame, the beam energy density must be at least 50 cm/killowatt$^2$ to form a direct image. In systems with this magnitude of power, light amplification techniques are required (e.g., See U.S. Pat. No. 5,822,345, entitled "Diode-Pumped Laser System and Method"). It is very difficult to achieve significant beam energy at media surfaces for laser imaging systems having high magnification factors, within a compact laser scanner system.

Multimode laser diodes are generally considered not suitable for laser imaging systems incorporating scanner assemblies. Multimode laser diodes have wide orifices or emitters resulting in undesirably large spot sizes. Multiple wavelengths emitted from such diodes have resulted in diffractive errors.

SUMMARY OF THE INVENTION

The present invention provides a laser imaging system for direct imaging with high optical power a series of pixels forming an image on a media surface. The laser imaging system includes a laser light source, wherein the laser light source emits a laser beam representative of the image to be scanned on the media surface. An optical path is defined between the laser light source and the media surface. A scanner is provided having a mirrored surface positioned along the optical path. An optical assembly is positioned along the optical path for shaping and focusing the laser beam at the media surface, including an F-Theta lens assembly positioned along the optical path between the scanner and the media surface. The F-Theta lens assembly including a spheric lens, an aspheric lens and a toric lens, providing an increase in optical power density at the media surface.

In another embodiment, the present invention provides an imaging system for direct imaging with high optical power density a series of pixels forming an image on a media surface. The system includes a first imaging module including a collimated laser light source, wherein the laser light source emits a multimode laser beam representative of the image scanned on the media surface. An optical path is defined between the laser light source and the media surface. A scanner is provided having a mirrored surface positioned along the optical path, the scanner being rotatable about an axis of rotation for producing a scan line on the media surface. An optical assembly is positioned along the optical path for shaping and focusing the collimated laser beam at the media surface. The optical assembly includes an F-Theta lens assembly positioned along the optical path between the scanner and the media. The F-Theta lens assembly including a spheric lens, an aspheric lens and a toric lens, providing an increase in power density at the media surface. A first mechanism is provided for translational movement of the first imaging module in a first direction along the axis of rotation of the scanner during operation of the laser imaging system. In one aspect, a feeder mechanism is provided for imparting relative movement between the scanner assembly and the media surface in a direction substantially perpendicular to the rotational axis of the scanner assembly. The feeder mechanism timing is coordinated (i.e., synchronized) with the scanner and translational mechanism.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principals of the invention. Other embodiments of the present invention and many of the intended advantages of the present invention will be readily appreciated as the same become better understood by reference to the following detailed description when considered in connection with the accompanying drawings, in which like reference numerals designate like parts throughout the figures.

DETAILED DESCRIPTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
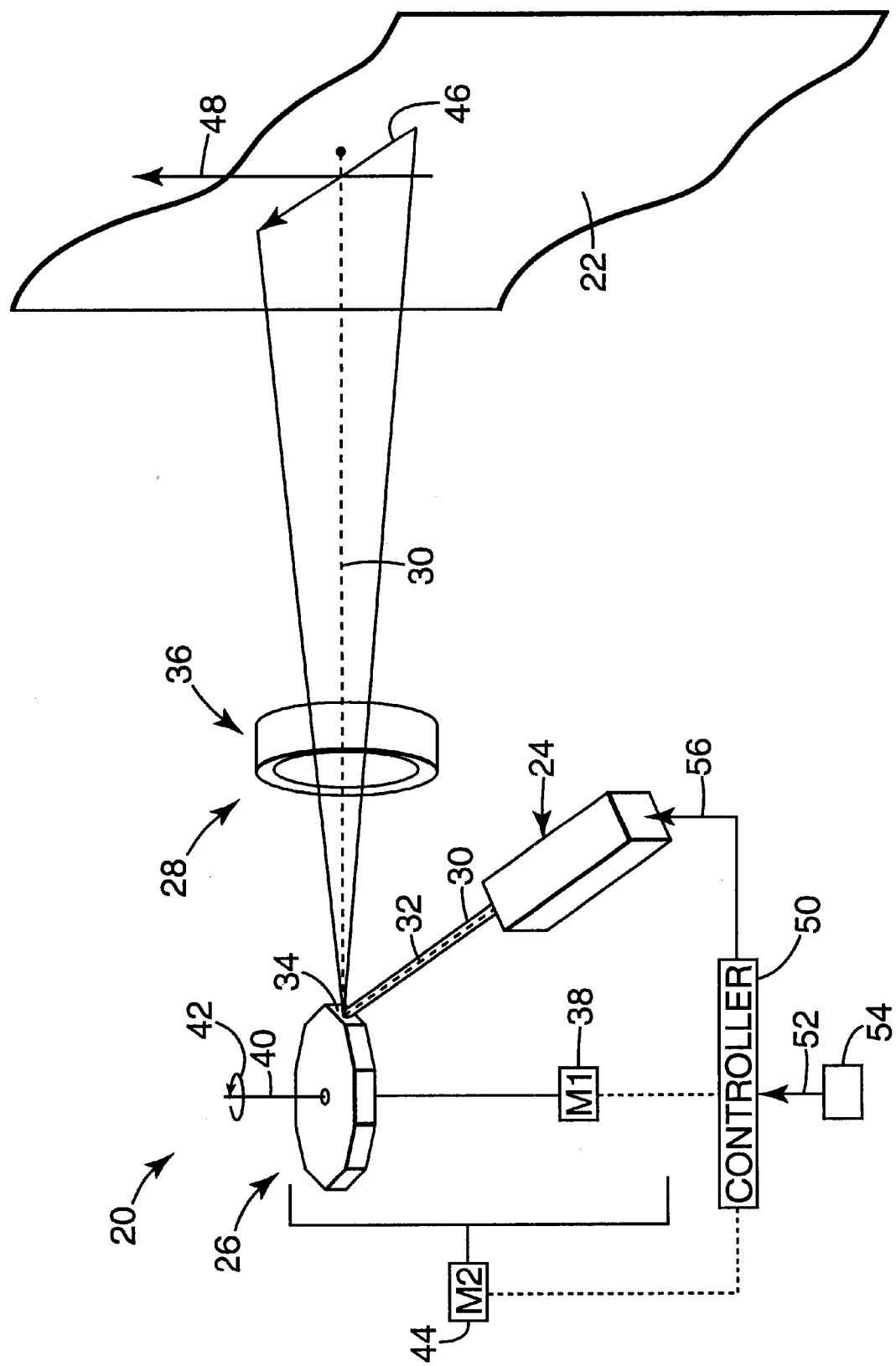
FIG. 1. is a schematic drawing of one exemplary embodiment of a laser imaging system including an optical assembly according to the present invention.

In FIG. 1, a laser imaging system or system in accordance with the present invention is generally indicated at 20. The laser imaging system 20 is shown in an operational position for direct imaging with high optical power a series of pixels forming an image on a media surface 22. The laser imaging system 20 utilizes a unique system for directing, focusing and demagnification of a laser beam for directly exposing an image on media surface 22. Laser imaging system 20 provides a compact laser imaging assembly suitable for use with media requiring high optical power density at the media surface to form an image.

In one exemplary embodiment, laser imaging system 20 includes a collimated light source 24, a scanner 26, and an optical assembly 28. The laser light source 24 emits a collimated laser beam 30 representative of the image scanned on the media surface 22. An optical path 32 is defined between the laser light source 24 and the media surface 22. The scanner 26 includes a mirrored surface 34 positioned along the optical path 32. The optical assembly 28 is positioned along the entire optical path 32 for shaping and focusing the collimated laser beam 30 at the media surface 22. The optical assembly 28 includes an F-Theta lens assembly 36 positioned along the optical path 32 between the scanner 26 and the media surface 22. In one embodiment described in detail later in this specification, F-Theta lens assembly 36 includes a spherical lens and a toric lens. The F-Theta lens assembly 36 provides an increase in optical power density at the media surface. The optical assembly 28 has a magnification of one or less than one in at least one direction for shaping and focusing the laser beam 30 at the media surface 22. Preferably, the F-Theta lens assembly is a demagnification lens assembly having a magnification factor of less than one in at least one direction.

In one embodiment, the laser imaging system 20 is used as part of a larger printing or imaging system. The imaging system 20 further includes a scanner motor 38 (M1) for rotating scanner 26 about an axis of rotation 40, indicated by directional arrow 42, during operation of the laser imaging system 20. A translational mechanism 44 imparts translational movement to the laser imaging system 20. Translational mechanism 44 may include a motor (indicated as M2). In particular, during operation of laser imaging system 20 a scan line 46 is scanned across the media 22, referred to as the "fast scan" direction. Simultaneously, translational mechanism 44 operates to move the laser imaging system 20 translationally across the media surface 22, in a direction 48 substantially perpendicular to the scan line 46 (and substantially parallel to (i.e., along) the axis of rotation 40), referred to as the "slow scan" direction.

Controller 50 operates to control the imaging process for imaging system 20. Controller 50 is preferably a microprocessor-based control system, or other control system suitable of performing a sequence of logical operations and interfacing with the components of imaging system 20. Controller 50 receives digital image data 52 from a digital data source 54, such as digital image data generated by a computer-controlled or microprocessor-based scanner system. The digital image data is a sequence of digital image values representative of the image to be direct imaged on the media surface 22. Controller 50 provides the digital image data 52 to collimated light source 24. In particular, controller 50 operates to coordinate the digital image data 52 provided to collimated light source 24 with the operation of laser imaging system 20, including the rotation of scanner 26 via scanner motor 38 and the translational movement of laser imaging system 20 via translational mechanism 44.

In one exemplary embodiment, collimated light source 24 includes a relatively low input power multimode laser diode, a microlens, and a collimating lens. In one embodiment, the multimode laser diode is a semiconductor laser diode with a single emitter cavity. The multimode laser diode has a power range from 200 milliwatts to 4 watts. In one embodiment, the laser beam light emitted from the multimode laser diode ranges from 1 micron×50 microns up to 1 micron×500 microns. As such, in order to get the desired power density at the media surface the laser beam is demagnified through optical assembly 28 down to about 40 to 60 microns in one direction (i.e., the slow scan direction), while allowing the light to be magnified up to 20 microns in the other direction (i.e., the fast scan direction). At the location where the laser beam is emitted from the multimode laser diode, the laser beam diverges. As such, the microlens is positioned at the end of the multimode laser diode to reduce the divergent properties of the light beam. One suitable microlens is available from Blue Sky of San Jose, Calif. One suitable laser diode is a multimode laser diode available from SDL of San Jose, Calif.

Alternatively, light source 24 may be a fiber coupled light source instead of a collimated light source. For example, the laser light source can include a fiber coupled diode ranging from 60 to 104 microns. Other suitable light sources will become apparent to one skilled in the art after reading this application.

In one preferred embodiment, scanner 26 is a polygonal or polygon scanner. In the exemplary embodiment shown, the polygon scanner has eight mirrored sides or facets for directing the laser beam 30 across the media surface 22 to form scan line 46. As such, upon one rotation of scanner 26, eight scan lines are scanned across the media surface 22, one from each facet of the polygon scanner. Alternatively, other mirror systems may be utilized for directing/redirecting the laser beam 30 across the media surface 22 to form scan line 46. In one alternative embodiment, scanner 26 is a galvanometer scanner which moves or vibrates a mirrored surface back and forth rather than a complete rotation, reducing the scan interval. The timing operation of the galvanometer scanner can be characterized with a "sawtooth" wave form, having a longer linearized portion during the scan time, and a short retrace time as known to one in the art, allowing for rapid repositioning of the mirror for the next scan. In another embodiment, the scanner 26 is a harmonic resonant scanner. Large vibrations of a mirrored surface are sustained at or near the resonant frequency providing sinusoidal oscillation. In yet another embodiment, scanner 26 is a holographic disc scanner. Other suitable light redirecting assemblies will become apparent to one skilled in the art after reading the present application.

F-Theta lens assembly 36 operates to shape, focus and demagnify laser beam 30 at the media surface 22. In particular, demagnification of laser beam 32 in the slow scan direction provides for a higher energy laser beam at the media surface 22. Preferably, F-Theta lens (or flat field lens) assembly 36 is a demagnification lens assembly having a magnification factor of less than one. More preferably, F-Theta lens assembly 36, along with the entire optical assembly 28, has a magnification factor of less than 0.6, providing a power density greater than 50 kilowatts per $cm^2$ at the media surface 22, and more preferably a power density between 100 and 600 kilowatts per $cm^2$ at the media surface 22. As such, the input power of the collimated laser light source 24 is relatively low, but the power density of the demagnified focused beam is high at the media surface 22 as required by certain media types. The demagnification of laser imaging system 20 results in a high-power density scan line 46 of a relatively short length. In one exemplary embodiment, the length of scan line 46 is less than one inch. In another exemplary embodiment, the length of scan line 46 is one-half inch. Accordingly, the laser imaging system 20 according to the present invention is suitable for use with media requiring high power density light sources. In one aspect, media surface 22 requires a relatively high optical power density for direct imaging of an image on the media surface. In one aspect, media 22 includes a metal/metal oxide imageable layer, imageable by laser beam exposure at sufficient power densities (e.g., black aluminum oxide based media). Suitable imaging media is disclosed in U.S. Pat. No. 5,766,827 to Bills et al., entitled, "Process of Imaging Black Metal Thermally Imageable Transparency Elements," issued Jun. 16, 1998, and U.S. patent application Ser. No. 09/314,554 to Fitzer et al., entitled, "Method of Imaging an Article," filed May 19, 1997, both of which are assigned to Minnesota Mining and Manufacturing Company of St. Paul, Minn., U.S.A. and are incorporated herein by reference. Other suitable media for use with the direct laser imaging system according to the present invention will be apparent to one skilled in the art after reading the present application.

In one exemplary embodiment, laser imaging system 20 is used as part of a label making system. In one aspect, the label making system direct images label information onto a metal oxide based media. In one embodiment, the label making system is used as part of a manufacturing, packaging and shipping process.

Figure 2:
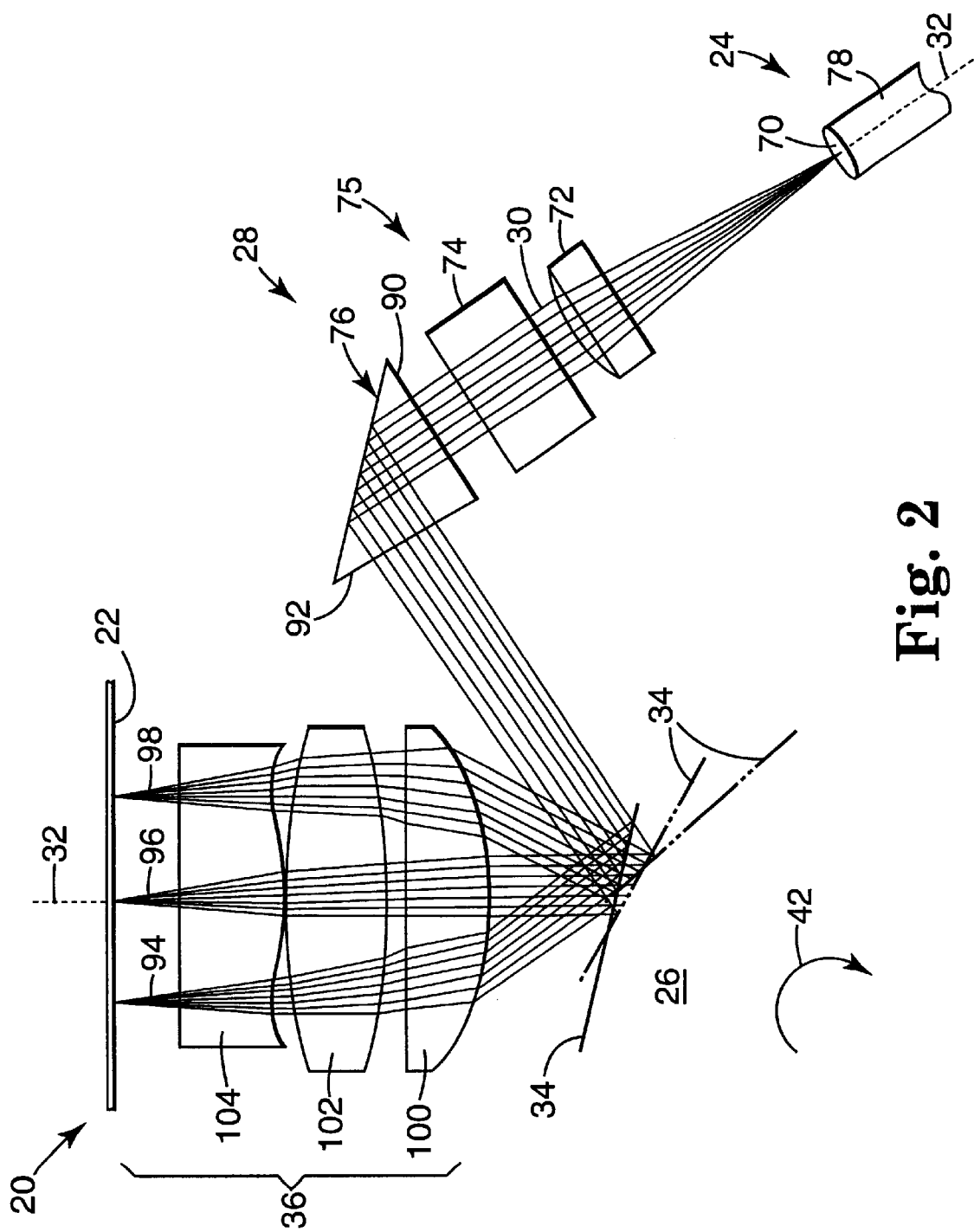
FIG. 2 is a diagram of a "fast scan" view illustrating one exemplary embodiment of an optical assembly used in a laser imaging system according to the present invention.
Figure 3:
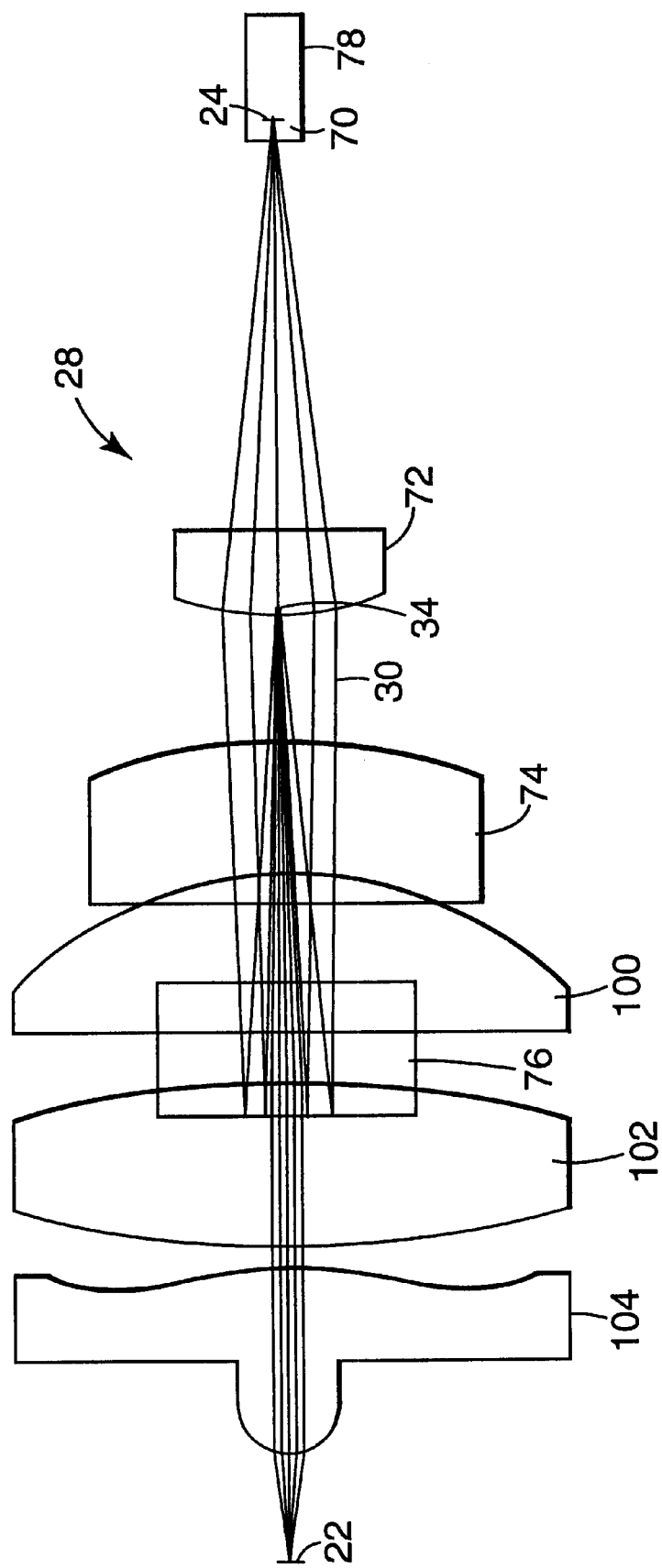
FIG. 3 is a diagram of a "slow scan" view of the optical assembly of FIG. 2.

FIG. 2 is a diagram of a "fast scan" view of one exemplary embodiment of laser imaging system 20 including optical assembly 28 according to the present invention, which can be similar to the laser imaging system 20 illustrated and described in reference to FIG. 1. Imaging system 20 includes the optical assembly 28 plus mechanical components including scanner 26, light redirecting mechanism 76 and light source 24. FIG. 3 is a diagram of a "slow scan" view of the imaging system diagramed in FIG. 2.

In the exemplary embodiment shown, optical assembly 28 includes F-Theta lens assembly 36, and further includes a fiber optic aspheric-plane lens or microlens 70, a collimating lens 72, and a cylindrical lens 74. A light redirecting mechanism is used, indicated at 76. Optical path 32 is defined between collimated light source 24 and media surface 22. Collimated light source 24 includes multimode laser diode 78. Microlens 70 is positioned at the location where light is emitted from the laser diode 78. Microlens 70 is a fiber optic aspheric-plane lens which reduces divergence of the laser beam 80 as it is emitted from (i.e., exits) the laser diode 78. Collimating lens 72 is positioned along the optical path between laser diode 78 and scanner 26. Collimating lens 72 operates to collimate the divergent laser beam 80 as it passes through the collimating lens 72 resulting in collimated (or parallel) laser beam 30.

Cylindrical lens 74 is positioned between the collimating lens 72 and the scanner 26. In one preferred embodiment, cylindrical lens 74 is a plano-convex lens. The focal point of cylindrical lens 74 is at the mirrored surface 34. The cylindrical lens 74 is oriented such that it does not change the shape of the laser beam 30 in the "fast axis" direction. In the "slow axis" direction (see FIG. 3), cylindrical lens 74 operates to focus the laser beam 30 at the mirrored surface 34 of scanner 26. Accordingly, the laser beam 30 has an oblong shape at mirrored surface 34.

In one aspect, the position of cylindrical lens 74 is changeable along the optical path 32 (e.g., the position relative to collimating lens 72) for changing the focal point along the optical path. As such, the cylindrical lens 74 can be moveable for focusing the laser beam at the media surface. In another aspect, the cylindrical lens assembly is part of a multicomponent system allowing for changing of the focal point along the optical path 32. A feedback system may also be provided for use with cylindrical lens 74 as part of an autofocus system.

Light redirecting mechanism 76 is positioned along the optical path 32 between cylindrical lens 74 and scanner 26. Light redirecting mechanism 76 provides for redirecting the laser beam 30 at the mirrored surface 34 of scanner 26 (such that the laser beam does not extend to media 22), allowing for a compact design configuration of the laser imaging system 20. In one preferred embodiment, light redirecting mechanism 76 is a right angle prism. First surface 90 and second surface 92 include anti-reflective coating, allowing for total internal reflection of laser beam 30 as it passes through the right angle prism. Accordingly, the right angle prism folds the beam 30, redirecting it towards the mirrored surface 34 of scanner 26. Alternatively, light redirecting mechanism 76 is a mirror assembly.

In one preferred embodiment, scanner 26 is a polygon scanner. As scanner 26 rotates, the laser beam 30 is scanned across F-Theta lens assembly 36, producing scan line 46 on media surface 22 (shown at locations 94, 96 and 98). F-Theta lens 36 is a telecentric lens within +/− seven degrees such that the laser beam 30 is normal (i.e., perpendicular) to the media surface 22 at each location along scan line 46 (e.g., location 94, 96, 98).

In one embodiment, F-Theta lens assembly 36 is comprised of three separate lenses. F-Theta lens assembly 36 includes a first spherical lens 100, a second spherical lens 102 and an aspheric-toric lens 104. First spheric lens 100 and second spheric lens 102 are high-index glass spherical lenses. Aspheric-toric lens 104 is a plastic or polymeric lens. In one embodiment, first spheric lens 100 is a plano-convex lens and second spheric lens 102 is a bi-convex lens. First spheric lens 100 and second spheric lens 102 operate as field flattening lenses to direct laser beam 30 substantially perpendicular (i.e., normal) to media surface 22. Further, first spheric lens 100 and second spheric lens 102 provide some demagnification of the laser beam 30. Aspheric-toric lens 104 provides most of the demagnification of laser beam 30, and focuses and shapes the laser beam 30 in a desired manner at the media surface 22.

FIG. 3 is a diagram illustrating the slow axis view of the optical assembly 28 shown in FIG. 2. As shown in FIG. 3, in the slow axis direction, cylindrical lens 74 has a focal point at the mirrored surface 34 of scanner 26. As such, cylindrical lens 74 operates to focus the laser beam 30 at the mirrored surface 34 in the slow scan direction. Upon exiting mirrored surface 34, laser beam diverges until it reaches F-Theta lens 36.

FIG. 4 through FIG. 10 illustrate the shape of the laser beam 30 on various surfaces along the optical path as it passes through optical assembly 28. Reference is also made to FIG. 1 and FIG. 3. For reference purposes, the fast axis is denoted by FS and the slow axis is denoted by SS.

Figure 4:
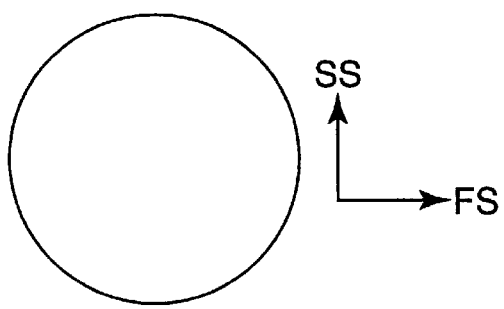
FIG. 4 is a diagram illustrating one exemplary embodiment of the shape of the laser beam along the optical path of a laser imaging system according to the present invention.
Figure 5:
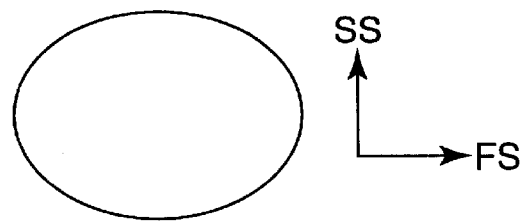
FIG. 5 is a diagram illustrating one exemplary embodiment of the shape of the laser beam along the optical path of a laser imaging system according to the present invention.

In FIG. 4, the collimated laser beam 30 exiting the collimating lens 72 is substantially collimated or parallel, indicated by a substantially circular shape. In FIG. 5, the laser beam exiting the light redirecting mechanism 76 is substantially oval shaped. Laser beam 30 has passed through the cylindrical lens 74, and as such is focused at the mirrored surface 34 along the slow axis direction, Accordingly, the laser beam 30 has begun to diverge in one direction, being longer along the fast axis and shorter along the slow axis.

Figure 6:
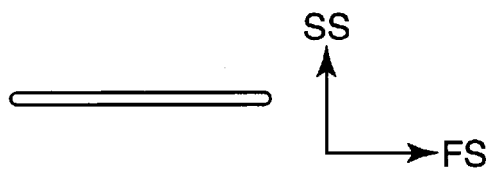
FIG. 6 is a diagram illustrating one exemplary embodiment of the shape of the laser beam along the optical path of a laser imaging system according to the present invention.

FIG. 6 illustrates the shape of the beam on the mirrored surface 34 of scanner 26. The laser beam 30 appears in the shape of a line. The laser beam 30 is focused at the mirrored surface 34 along the slow scan axis, but maintains its length along the fast scan axis.

Figure 7:
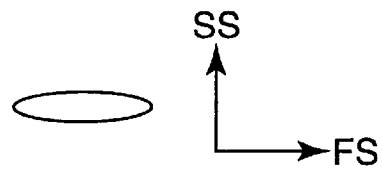
FIG. 7 is a diagram illustrating one exemplary embodiment of the shape of the laser beam along the optical path of a laser imaging system according to the present invention.
Figure 8:
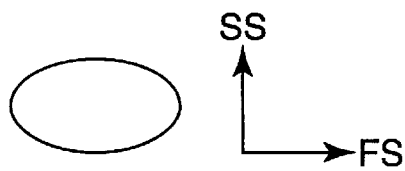
FIG. 8 is a diagram illustrating one exemplary embodiment of the shape of the laser beam along the optical path of a laser imaging system according to the present invention.
Figure 9:
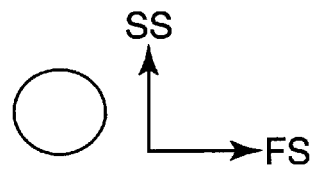
FIG. 9 is a diagram illustrating one exemplary embodiment of the shape of the laser beam along the optical path of a laser imaging system according to the present invention.
Figure 10:
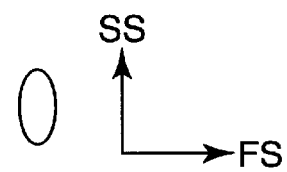
FIG. 10 is a diagram illustrating one exemplary embodiment of the shape of the laser beam along the optical path of a laser imaging system according to the present invention.

FIG. 7 through FIG. 10 illustrate the shaping and focusing of laser beam 30 as it passes through the F-Theta lenses, first spheric lens 100, second spheric lens 102 and aspheric-toric lens 104. FIG. 7 illustrates the shape of the laser beam on the first surface of the first spheric lens 100. Upon exiting the mirrored surface 34 the laser beam 30 begins to diverge in the slow scan axis direction, and as such appears substantially oval or oblong shaped. FIG. 8 illustrates the shape of the laser beam on the aspheric surface of the aspheric-toric lens 104. Again, the laser beam 30 continues to diverge in the slow scan axis direction, resulting in the laser beam having an oval shape. FIG. 9 illustrates the shape of the laser beam at the toric surface of the aspheric-toric lens 104. The laser beam 30 has a rounded square shape, being shaped, demagnified and focused. FIG. 10 illustrates the shape of the laser beam at the exit of the toric lens. The laser beam 30 has a generally oblong shape, being demagnified and focused at the media surface 22.

Figure 11:
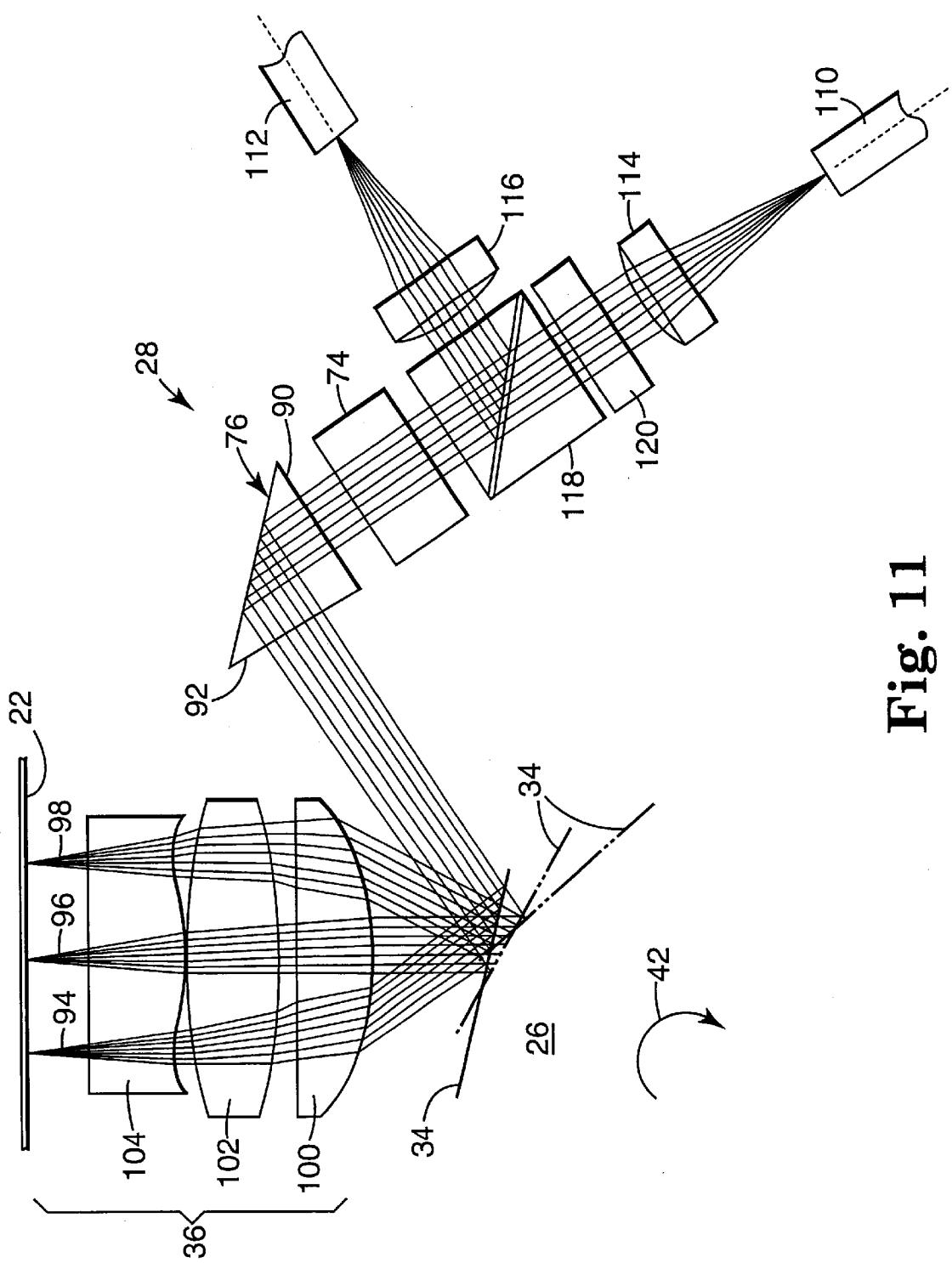
FIG. 11 is a diagram illustrating another exemplary embodiment of an optical assembly of a laser imaging system according to the present invention.
Figure 12:
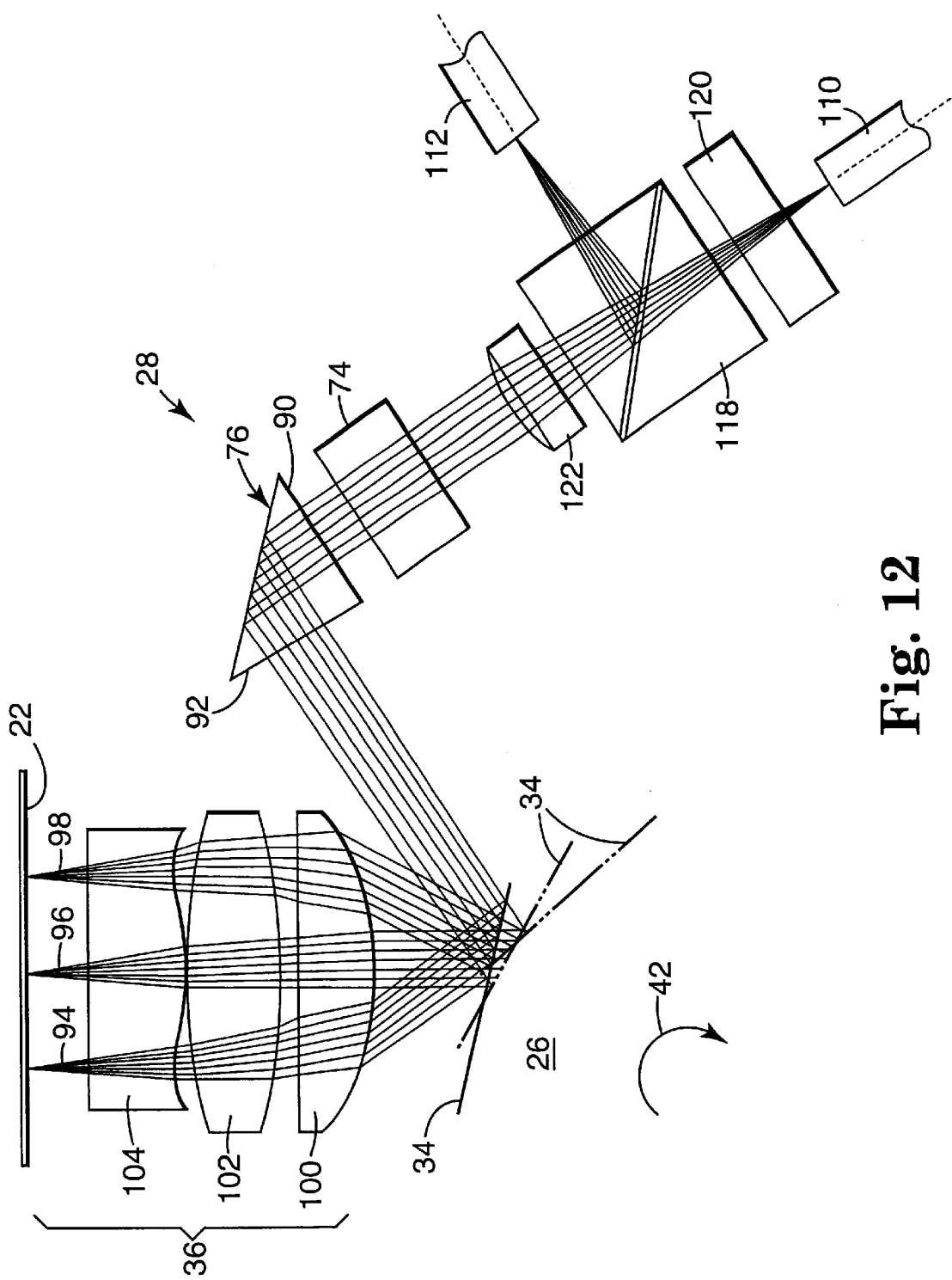
FIG. 12 is diagram illustrating another exemplary embodiment of an optical assembly of a laser imaging system according to the present invention.

FIG. 11 is a diagram illustrating another exemplary embodiment of the laser imaging system according to the present invention. It may be desirable to provide additional laser power to the laser imaging system 20, allowing for higher power densities and faster scanning speeds at the media surface 22. Accordingly, multiple laser sources may be utilized. In the exemplary embodiment shown a first laser source 110 and a second laser source 112 are superimposed, providing the laser beam power for the laser imaging system 20. The first laser source 110 and the second laser source 112 are separately collimated before combining the laser beams. In particular, the laser beam from first laser source 110 travels through first collimating lens 114 and the laser beam from second laser source 112 travels through second collimating lens 116. The laser beam from first laser source 110 and the laser beam from second laser source 112 are combined in a polarizing cube prism 118. However, since the laser beam from first laser source 110 is passing straight through the polarizing cube prism, the plane of polarization must be rotated 90 degrees before it enters the cube, which is achieved through the use of a half-wave retarder 120. Alternatively, as shown in FIG. 12, a single collimater 122 maybe positioned along the optical path after the half-wave retarder 120, for collimating the combined laser beam.

Figure 13:
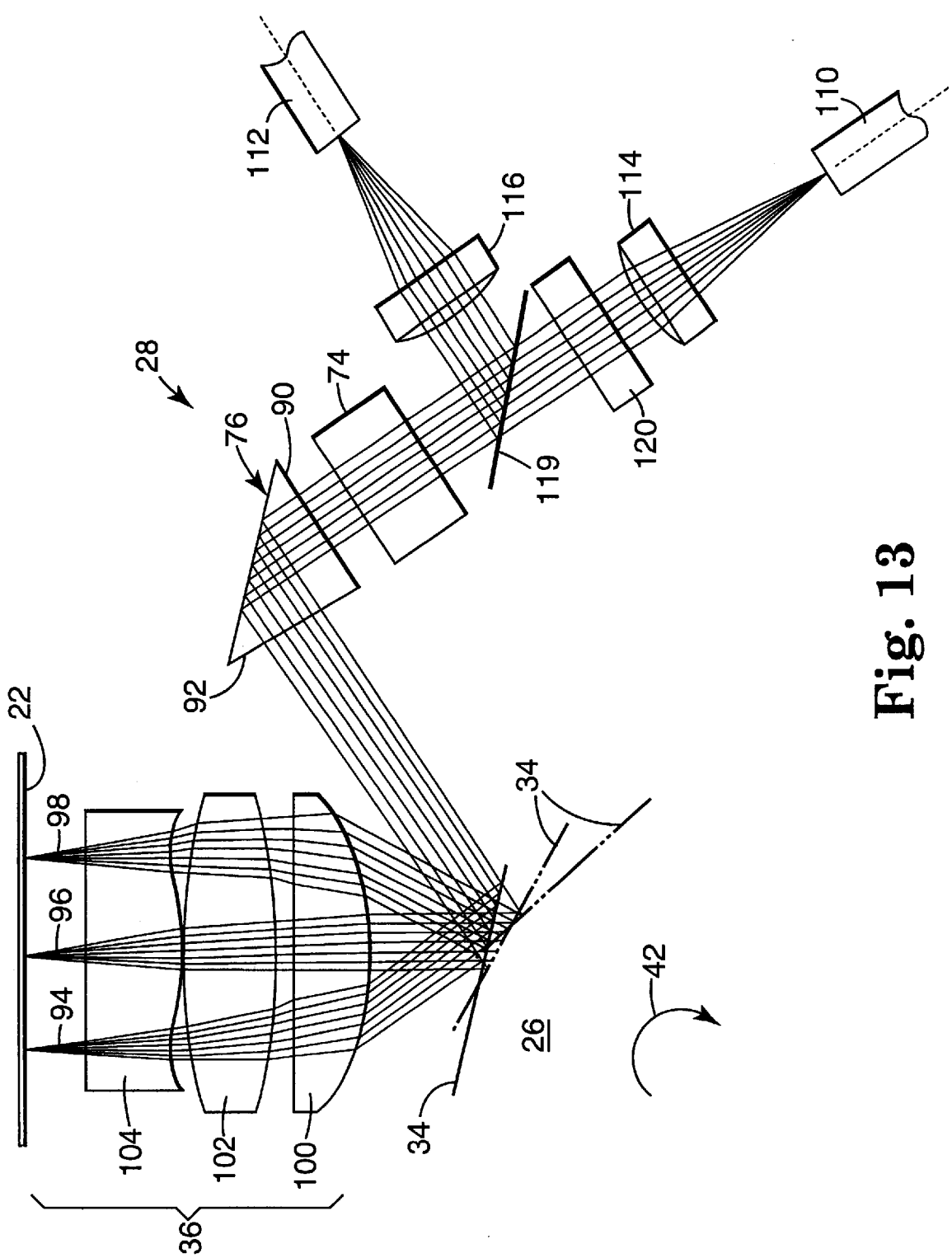
FIG. 13 is a diagram illustrating another exemplary embodiment of an optical assembly of a laser imaging system according to the present invention.

FIG. 13 is a diagram illustrating another exemplary embodiment of the laser imaging system according to the present invention. The laser imaging system 20A includes the use of a dichroic mirror and two lasers having different wavelengths for improving optical efficiency. The system includes dichroic mirror 119, first laser light source 110A and second laser light source 112A. Dichroic mirror 119 allows one wavelength of light to pass through the mirror and another wavelength of light to be reflected. In one embodiment, for a laser light system having two laser light sources with different wave lengths, the dichroic mirror 119 allows the laser light having the longer wavelength to pass through while reflecting the shorter wavelength laser light. In one exemplary embodiment, light source 110 is a 975 nanometer light source, and light source 112 is an 808 nanometer light source. In operation, the 808 nanometer light source 112 is reflected from mirror 119 into the optical path. The 975 nanometer light source 110 is transmitted through the mirror 119, and also into the optical path. Preferably, the wavelength of light source 110 is relatively close to the wavelength of light source 112. The optical assembly 28 utilizing dichroic mirror 119 results in less loss in power in combining two laser light sources.

Figure 14:
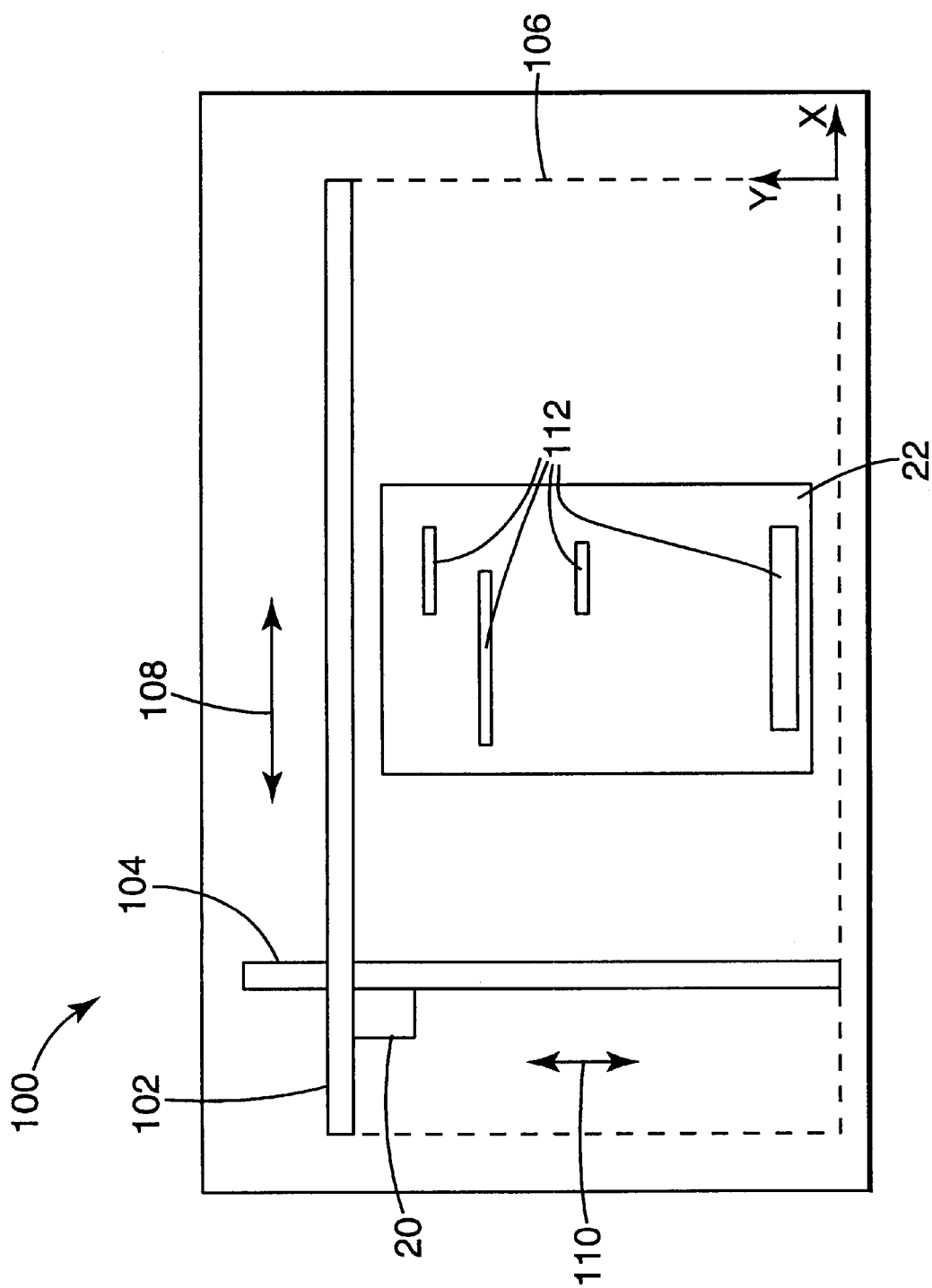
FIG. 14 is a diagram illustrating one exemplary embodiment of the laser imaging system according to the present invention used in a two-dimensional (x-y) coordinate system.

FIG. 14 is a diagram illustrating one exemplary embodiment of laser imaging system 20 used for direct imaging in a two-dimensional or x-y plane. A laser imaging system according to the present invention is shown at 20. The laser imaging system 20 can be utilized in a printer or imaging system similar to an x-y plotter or ink jet printer. In one exemplary embodiment shown, the imaging system 100 includes a first control carriage 102 and a second control carriage 104. Imaging material or media is located at 22. The imaging system 100 can be programmed to image within laser imaging area 106. In one embodiment, control carriage 102 provides for translational motion of laser imaging system 20 in a first direction 108. The first direction 108 is shown along an x-axis. The control carriage 104 provides for movement of laser imaging system 20 in a second dimension or direction 110. The second direction 110 is shown along an x-axis. As such, laser imaging system 20 may be precisely controlled via controller 50 for precise imaging of desired areas 112 within the laser imaging area 106.

Figure 15:
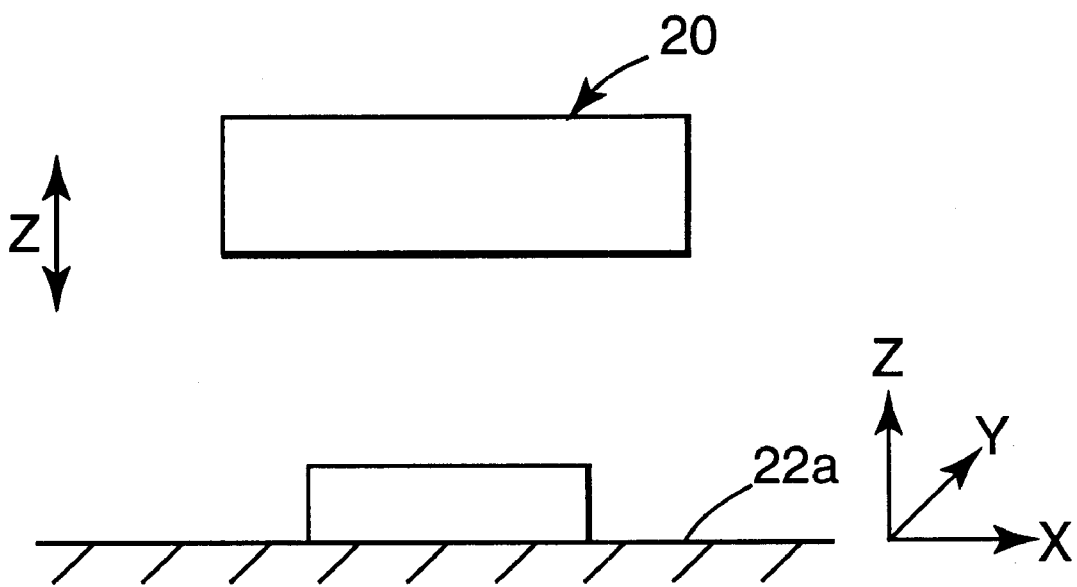
FIG. 15 is a diagram illustrating one exemplary embodiment of the laser imaging system according to the present invention used in a three-dimensional (x, y and z) coordinate system.

In FIG. 15, a diagram is shown illustrating another exemplary embodiment of the laser imaging system according to the present invention for imaging in a third dimension or direction. As shown, laser imaging system 20 may further be moved in a third direction or "z" direction during imaging. As such, laser imaging system 20 can be utilized for imaging media within a three-dimensional plane. In operation, the three-dimensional surface 22A would first be scanned, with the scanned coordinates being stored within controller 50. In response, controller 50 operates imaging system 20 for movement in a first, x direction; a second, y direction; and a third, z direction to compensate for the three-dimensional topography of media surface 22A.

Figure 16:
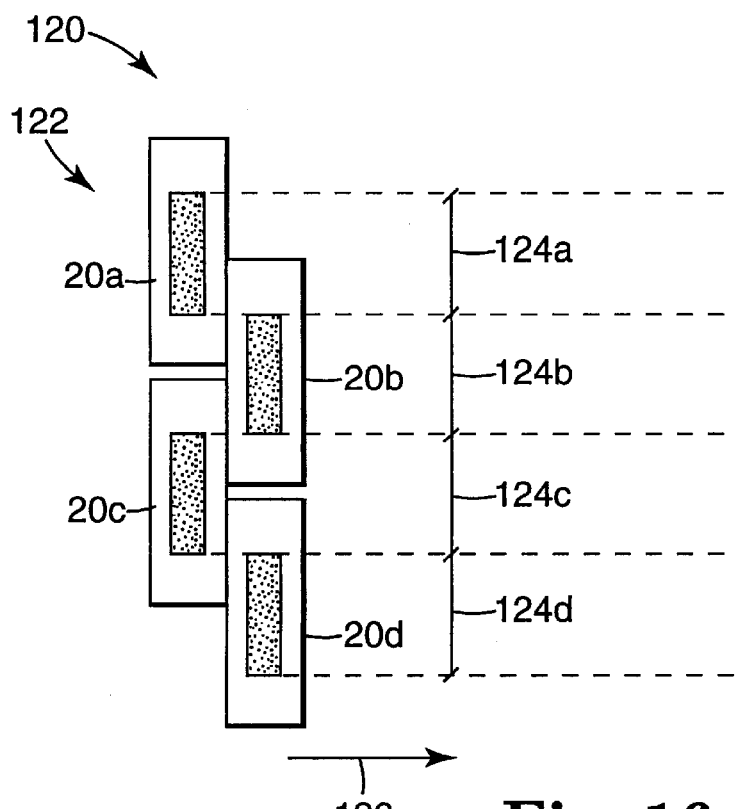
FIG. 16 is a diagram illustrating one exemplary embodiment of a multimodule laser imaging system according to the present invention.
Figure 17:
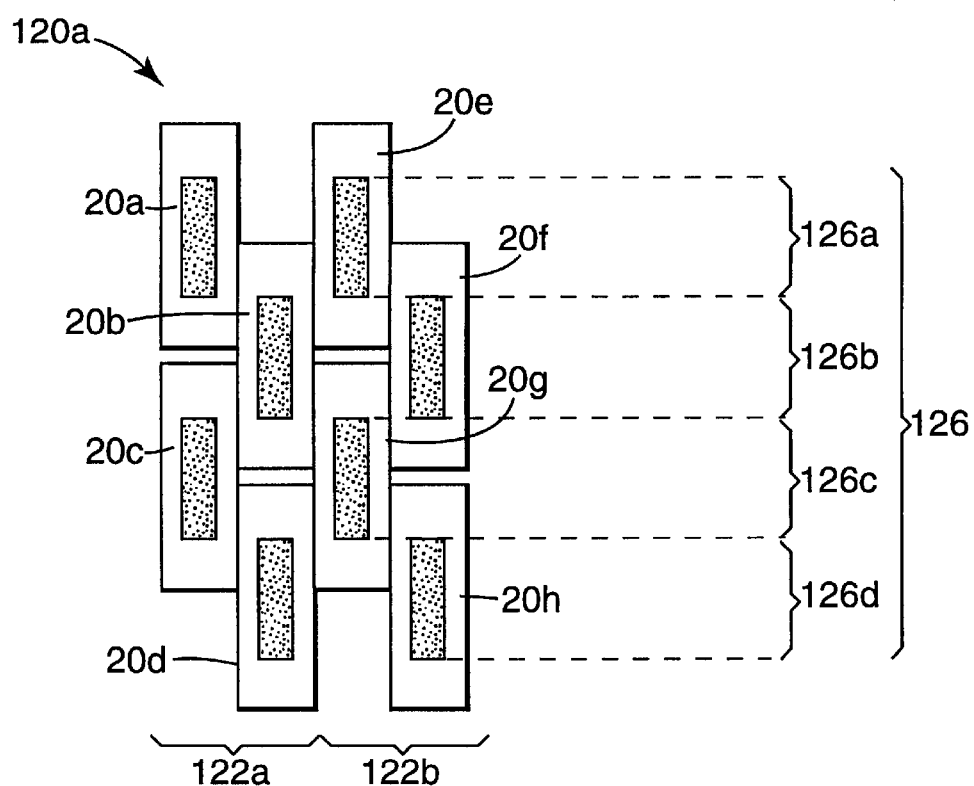
FIG. 17 is a diagram illustrating another exemplary embodiment of a multimodule laser imaging system according to the present invention.

In FIG. 16, a diagram is shown illustrating another exemplary embodiment of a laser imaging system according to the present invention. The laser imaging system 120 includes a group or array of laser imaging systems 20, indicated as laser imaging system 20A, 20B, 20C, 20D. The laser imaging system array 122 allows for two or more laser imaging systems to be utilized in unison for simultaneous direct imaging of a partial or entire media imaging area. In the exemplary embodiment shown, each imaging system 20A, 20B, 20C, 20D images a ½ inch scan line, indicated at 124A, 124B, 124C, 124D. As such, operation of imaging system 120 allows for simultaneous scanning of a two-inch column across an imaging material, indicated by directional arrow 126. As shown in FIG. 17, two laser imaging arrays may be combined to form a two by four array of laser imaging systems or modules, indicated by first array 120A and second array 120B. The use of a two by four array of laser imaging modules increases (i.e., doubles) the speed for direct imaging of the media.

Numerous characteristics and advantages of the invention have been set forth in the foregoing description. It will be understood, of course, that this disclosure is, and in many respects, only illustrative. Changes can be made in details, particularly in matters of shape, size and arrangement of parts without exceeding the scope of the invention. The invention scope is defined in the language in which the appended claims are expressed.

What is claimed is:

1. A laser imaging system with high optical power density for direct image of an image on a media surface, the system comprising:
    a laser light source, wherein the laser light source emits a laser beam representative of the image on the media surface;
    an optical path defined between the laser light source and the media surface;
    a scanner having a mirrored surface positioned along the optical path;
    an optical assembly positioned along the optical path for shaping and focusing the laser beam at the media surface, including an F-Theta lens assembly positioned along the optical path between the scanner and the media surface, the F-Theta lens assembly including a spheric lens, an aspheric lens and a toric lens, providing an increase in optical power density at the media surface.

2. The laser imaging system of claim 1, wherein the optical assembly has a magnification factor of less than one in at least one direction.

3. The laser imaging system of claim 2, wherein the F-Theta lens assembly is a demagnification lens assembly.

4. The laser imaging system of claim 1, wherein the toric lens is positioned on a surface of the aspheric lens.

5. The laser imaging system of claim 1, wherein the scanner is a polygon scanner.

6. The laser scanner assembly of claim 1, wherein the scanner is a galvanometer scanner.

7. The laser imaging system of claim 1, wherein the laser light source is a multimode laser light source.

8. The laser imaging system of claim 7, wherein the laser light source is a collimated laser light source including a multimode semiconductor laser diode with single emitter cavity.

9. The laser imaging system of claim 1, wherein the laser beam exiting the laser light source ranges from 1 micron by 50 microns to 1 micron by 300 microns.

10. The laser imaging system of claim 1, wherein the laser light source includes a fiber coupled diode ranging from 60 to 104 microns.

11. The laser imaging system of claim 1, wherein the optical assembly further includes a plano-convex lens positioned along the optical path between the collimated laser light source and the scanner, having a focal point in one direction at the mirrored surface.

12. The laser imaging system of claim 11, wherein the plano-convex lens is moveable along the optical path for changing the focal point.

13. The laser imaging system of claim 11, further comprising a light redirecting mechanism positioned along the optical path between the plano-convex lens and scanner.

14. The laser imaging system of claim 1, wherein the scanner operates to scan the laser beam on the media surface along a scan line of one inch or less.

15. An imaging system for direct imaging with high optical power density a series of pixels forming an image on a media surface, the system comprising:
    a first imaging module comprising:
        a collimated laser light source, wherein the laser light source emits a multimode laser beam representative of the image on the media surface;
        an optical path defined between the laser light source and the media surface;
        a scanner having a mirrored surface positioned along the optical path, the scanner is rotatable about an axis of rotation for producing a scan line on the media surface;
        an optical assembly positioned along the optical path for shaping and focusing the collimated laser beam at the media surface, including an F-Theta lens assembly positioned along the optical path between the scanner and the media surface, the F-Theta lens assembly including a spheric lens, an aspheric lens and a toric lens, providing an increase in optical power density at the media surface; and
    a first mechanism for translational movement of the first imaging module in a first direction along the axis of rotation of the scanner during operation of the laser imaging system.

16. The system of claim 15, further comprising a second mechanism for movement of the first imaging module in a second direction different form the first direction.

17. The system of claim 16, further comprising a third mechanism for movement of the first imaging module in a third direction different from the first direction and the second direction, allowing for direct imaging of a multi-dimensional surface.

18. The system of claim 15, further comprising a second imaging module similar to the first imaging module.

19. The system of claim 18, wherein the first imaging module is direct coupled to the second imaging module.

20. The system of claim 15, further comprising a feeder mechanism for imparting relative movement between the scanner assembly and the media surface in a direction substantially perpendicular to the rotational axis of the scanner assembly.

21. The system of claim 15, wherein the feeder mechanism engages the media to move the media relative to the scanner mechanism.

22. The system of claim 15, wherein the F-Theta lens assembly has a magnification factor of less than one.

23. The system of claim 15, wherein the scanner operates to scan the laser beam on the media surface along a scan line of one inch or less.

24. A laser imaging system for direct imaging with high optical power an image on a media surface, the system comprising:

a first collimated laser light source, wherein the first laser light source emits a first multimode laser beam having a first wavelength, representative of the image on the media surface;

a second collimated laser light source, wherein the second laser light source emits a second multimode laser beam having a second wavelength, representative of the image on the media surface;

an optical path defined between the first laser light source, the second laser light source and the media surface;

a combining mechanism positioned along the optical path for combining the first laser beam with the second laser beam defining a collimated laser beam;

a scanner having a mirrored surface positioned along the optical path; and an optical assembly positioned along the optical path for shaping and focusing the collimated laser beam at the media surface, including an F-Theta lens assembly positioned along the optical path between the scanner and the media surface, the F-Theta lens assembly including a spheric lens, an aspheric lens and a toric lens, providing an increase in optical power density at the media surface.

25. The system of claim 24, wherein the first wavelength is substantially the same as the second wavelength, and wherein the combining mechanism is a polarizing cube prism.

26. The system of claim 24, wherein the first wavelength is different than the second wavelength, and wherein the combining mechanism is a Dichroic mirror.

* * * * *

UNITED STATES PATENT AND TRADEMARK OFFICE
CERTIFICATE OF CORRECTION

PATENT NO.     : 6,396,616 B1
DATED          : May 28, 2002
INVENTOR(S)    : Fitzer, Robert C.

It is certified that error appears in the above-identified patent and that said Letters Patent is hereby corrected as shown below:

Title page,
Item [56], FOREIGN PATENT DOCUMENTS, delete "EP 0708520" and insert in place thereof -- EP 0708550 --;

Column 3,
Line 28, insert -- a -- following "is" and preceding "diagram".

Signed and Sealed this

Thirty-first Day of December, 2002

JAMES E. ROGAN
*Director of the United States Patent and Trademark Office*